(12) United States Patent
Kikuchi et al.

(10) Patent No.: US 7,857,395 B2
(45) Date of Patent: Dec. 28, 2010

(54) SEAT, SEAT CUSHION AND BACKREST THEREOF

(75) Inventors: Yoshiharu Kikuchi, Shioya-gun (JP); Masanori Suzuki, Shioya-gun (JP)

(73) Assignee: TS Tech Co., Ltd., Asaka (JP)

( * ) Notice: Subject to any disclaimer, the term of this patent is extended or adjusted under 35 U.S.C. 154(b) by 0 days.

(21) Appl. No.: 12/285,411

(22) Filed: Oct. 3, 2008

(65) Prior Publication Data
US 2009/0096256 A1 Apr. 16, 2009

(30) Foreign Application Priority Data
Oct. 11, 2007 (JP) .............................. 2007-265574

(51) Int. Cl.
A47C 7/02 (2006.01)
A47C 31/00 (2006.01)
(52) U.S. Cl. .............................. 297/452.47; 297/180.14
(58) Field of Classification Search ............ 297/452.47, 297/452.46, 180.1, 180.13, 180.14, 180.11
See application file for complete search history.

(56) References Cited

U.S. PATENT DOCUMENTS

| 3,550,523 | A | | 12/1970 | Irving |
| 4,043,544 | A | | 8/1977 | Isrner |
| 5,226,188 | A | * | 7/1993 | Liou .............................. 5/653 |
| 5,597,200 | A | | 1/1997 | Gregory et al. |
| 5,645,314 | A | * | 7/1997 | Liou ..................... 297/180.14 |
| 5,924,766 | A | | 7/1999 | Esaki et al. |
| 5,927,817 | A | * | 7/1999 | Ekman et al. .......... 297/452.47 |
| 6,048,024 | A | | 4/2000 | Wallman |
| 6,179,706 | B1 | | 1/2001 | Yoshinori et al. |
| 6,206,465 | B1 | | 3/2001 | Faust et al. |
| 6,224,150 | B1 | | 5/2001 | Eksin et al. |
| 6,478,369 | B1 | | 11/2002 | Aoki et al. |
| 6,481,801 | B1 | | 11/2002 | Schmale |
| 6,685,553 | B2 | | 2/2004 | Aoki |
| 6,736,452 | B2 | | 5/2004 | Aoki et al. |
| 6,786,541 | B2 | * | 9/2004 | Haupt et al. ............. 297/180.1 |
| 6,857,697 | B2 | | 2/2005 | Brennan et al. |
| 7,322,643 | B2 | * | 1/2008 | Ishima et al. ........... 297/180.1 |
| 2002/0067064 | A1 | | 6/2002 | Jaillet et al. |
| 2004/0090093 | A1 | | 5/2004 | Kamiya et al. |
| 2004/0104607 | A1 | * | 6/2004 | Minegishi et al. ...... 297/180.14 |
| 2004/0139758 | A1 | | 7/2004 | Kamiya et al. |
| 2004/0226098 | A1 | | 11/2004 | Pearce |
| 2005/0264086 | A1 | | 12/2005 | Lofy et al. |
| 2006/0284455 | A1 | * | 12/2006 | Terech ................... 297/180.14 |
| 2007/0040421 | A1 | | 2/2007 | Zuzga et al. |
| 2008/0073966 | A1 | * | 3/2008 | Ali et al. ................ 297/452.46 |

FOREIGN PATENT DOCUMENTS

| JP | U 63-149333 | 6/1988 |
| JP | A 06-048448 | 2/1994 |

(Continued)

Primary Examiner—Milton Nelson, Jr.
(74) Attorney, Agent, or Firm—Oliff & Berridge, PLC

(57) ABSTRACT

A backrest of a seat includes: a pad including a slit air guide hole which penetrates the pad from a front surface of the pad to a rear surface of the pad; a base member for blocking the air guide hole on a rear side of the pad, the base member including an inlet hole communicated with the air guide hole; and a cover for blocking the air guide hole on the front surface of the pad, the cover including a plurality of outlet holes communicated with the air guide hole.

16 Claims, 7 Drawing Sheets

FOREIGN PATENT DOCUMENTS

| | | |
|---|---|---|
| JP | A-10-276859 | 10/1998 |
| JP | A-10-297274 | 11/1998 |
| JP | A 11-123124 | 5/1999 |
| JP | A 2002-219988 | 8/2002 |
| JP | A 2003-165325 | 6/2003 |
| JP | A 2003-285628 | 10/2003 |
| JP | A 2003-299551 | 10/2003 |
| JP | A 2004-082960 | 3/2004 |
| JP | A-2005-287532 | 10/2005 |
| WO | WO 02/053400 A2 | 7/2002 |
| WO | WO 2004020230 A1 * | 3/2004 |
| WO | WO 2006/102509 A1 | 9/2006 |

* cited by examiner

SEAT, SEAT CUSHION AND BACKREST THEREOF

BACKGROUND OF THE INVENTION

1. Field of the Invention

The present invention relates to a seat, a seat cushion and a backrest thereof, and more particularly to a seat having a ventilating function, and a seat cushion and a backrest thereof.

2. Description of the Related Art

Recently, a vehicular seat which has a function of blowing air out of a surface of a seat cushion for receiving buttocks of an occupant or out of a surface of a backrest for receiving a back of the occupant, has been known. As described in Japanese Patent Application Laid-Open No. 2005-287532, a plurality of blowout holes are formed to penetrate the seat cushion from the lower surface to the upper surface, a blower and a duct are attached to the lower surface of the seat cushion, and the plurality of blowout holes communicate with the duct on the lower surface side of the seat cushion. Thus, air sent by the blower passes through the duct to be divided into a plurality of blowout holes, and then blown from the blowout holes.

However, because one blower is shared for the plurality of blowout holes, it is necessary that the duct should communicate with these blowout holes. Consequently, it is required to form the duct so as to be branched or to be enlarged.

SUMMARY OF THE INVENTION

An object of the present invention is to dispense with the duct or to miniaturize the duct.

In accordance with a first aspect of the invention, a backrest of a seat comprises:

a pad comprising an air guide hole which penetrates the pad from a front surface of the pad to a rear surface of the pad;

a base member for blocking the air guide hole on a rear side of the pad, the base member comprising an inlet hole communicated with the air guide hole; and a cover for blocking the air guide hole on the front surface of the pad, the cover comprising a plurality of outlet holes communicated with the air guide hole.

In accordance with a second aspect of the invention, a seat cushion comprises:

a pad comprising an air guide hole which penetrates the pad from an upper surface of the pad to a lower surface of the pad;

a base member for blocking the air guide hole on a lower side of the pad, the base member comprising an inlet hole communicated with the air guide hole; and a cover for blocking the air guide hole on the upper surface of the pad, the cover comprising a plurality of outlet holes communicated with the air guide hole.

In accordance with a third aspect of the invention, a seat comprises:

a seat cushion; and the backrest as defined in the first aspect, the backrest being upright from a rear end of the seat cushion.

In accordance with a fourth aspect of the invention, a seat comprises:

the seat cushion as defined in the second aspect; and a backrest which is upright from a rear end of the seat cushion.

BRIEF DESCRIPTION OF THE DRAWINGS

The present invention will become fully understood from the detailed description given hereinafter and accompanying drawings given by way of illustration only, and thus are not intended as a definition of the limits of the present invention, and wherein.

DETAILED DESCRIPTION OF PREFERRED EMBODIMENT

Figure 1:
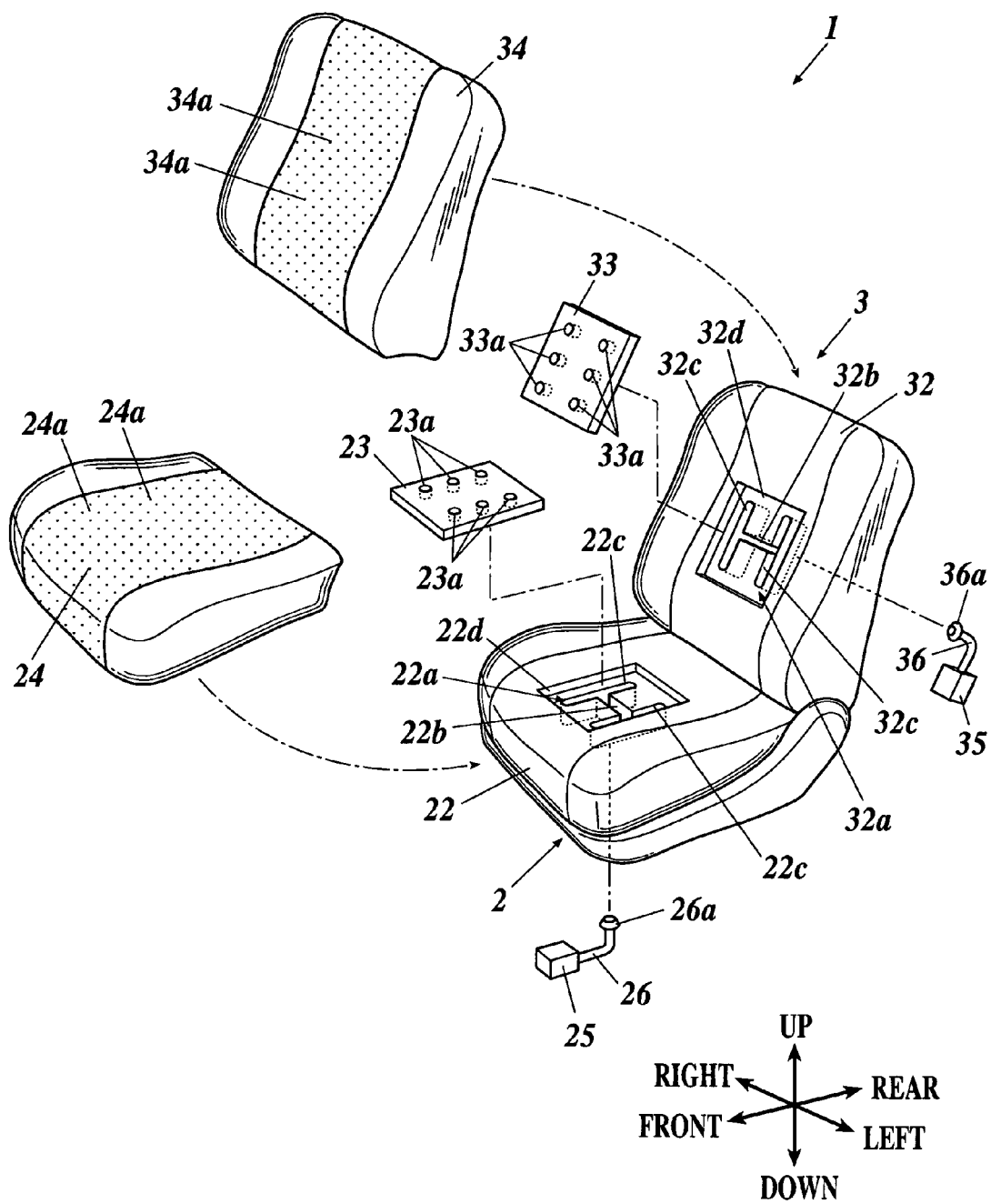
FIG. 1 is an exploded perspective view illustrating a vehicle seat according to an embodiment of the present invention.

The preferred embodiment of the present invention will be described below referring to the drawings. A variety of technically desirable limitations are added to the embodiment. However, a scope of the present invention is not limited to the embodiment.

FIG. 1 is an exploded perspective view illustrating a vehicle seat 1.

As shown in FIG. 1, the vehicle seat 1 includes a seat cushion 2 for receiving buttocks of an occupant, and a backrest 3 disposed in an upright state in a rear end of the seat cushion 2.

The seat cushion 2 is connected to a floor of a vehicle via a front-and-rear position adjusting mechanism and a height adjusting mechanism. A front-and-rear position of the seat cushion 2 is adjusted by the position adjusting mechanism, and a height of the seat cushion 2 is adjusted by the height adjusting mechanism. Well-known units can be used for the position adjusting mechanism and the height adjusting mechanism.

The backrest 3 is connected to the rear end of the seat cushion 2 via a reclining mechanism. The reclining mechanism adjusts an angle of the backrest 3 with respect to the seat cushion 2. The backrest 3 inclines backwardly and rises forwardly by the reclining mechanism, and the reclining mechanism locks the backrest 3.

Figure 2:
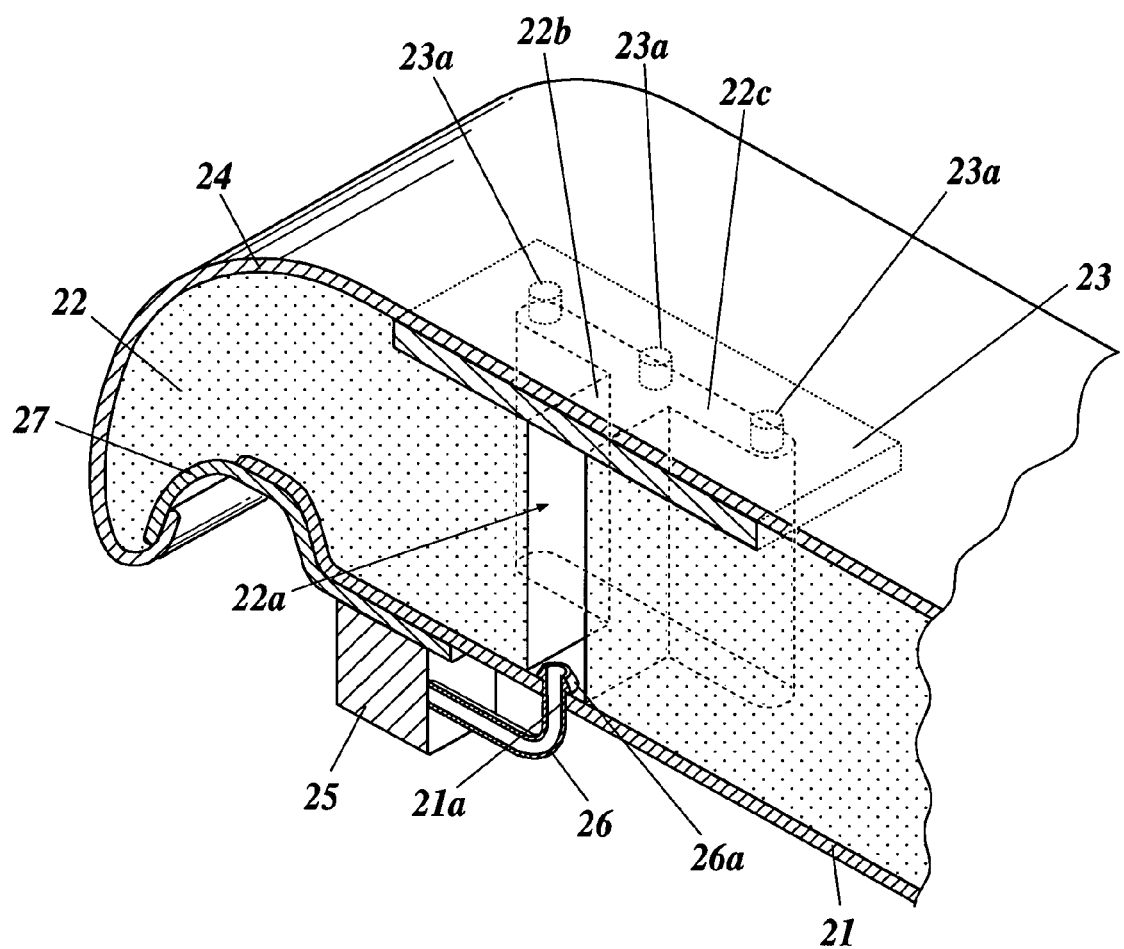
FIG. 2 is a perspective view illustrating a seat cushion of the vehicle seat in the state of cutting the seat cushion along the longitudinal section.

FIG. 2 is a perspective sectional view illustrating the seat cushion 2 in the state of cutting the seat cushion 2.

As shown in FIGS. 1 and 2, the seat cushion 2 includes a frame 27, a pad 22 disposed on the frame 27, a lining material 21 as a base member for the pad 22, a cover 23 disposed on the pad 22, a top cover member 24 for covering the pad 22 together with the cover 23, and a duct 26 and a blower 25 disposed below the frame 27.

The frame 27 constitutes a bone structure of the seat cushion 2, and made of, for example, metal. A spring is disposed in the frame 27, and the pad 22 is mounted on the frame 27 and the spring.

The pad 22 is made of a polyurethane foam material, and formed by foaming. The lining material 21 is stuck to a lower surface of the pad 22. The lining material 21 is integrated with the pad 22. Specifically, in a state of setting the lining material 21 in a mold, a foam resin raw material is supplied to the mold to be foamed and cured. Thereby, the pad 22 is formed and the lining material 21 is integrated with the pad 22. The lining material 21 is felt, press-felt, wool, or unwoven cloth. For example, the press-felt disclosed in Japanese Patent Application Laid-Open No. 2005-18530 is used as the lining material 21. The air permeability of the lining material 21 is preferably low.

In the pad 22, an air guide hole 22a is formed into an H slit shape. The air guide hole 22a penetrates the pad 22 from the upper surface to the lower surface. A position of the air guide hole 22a is preferably set such that a middle of the air guide hole 22a in a left-and-right direction is a middle of the pad 22 in a left-and-right direction.

Figure 3:
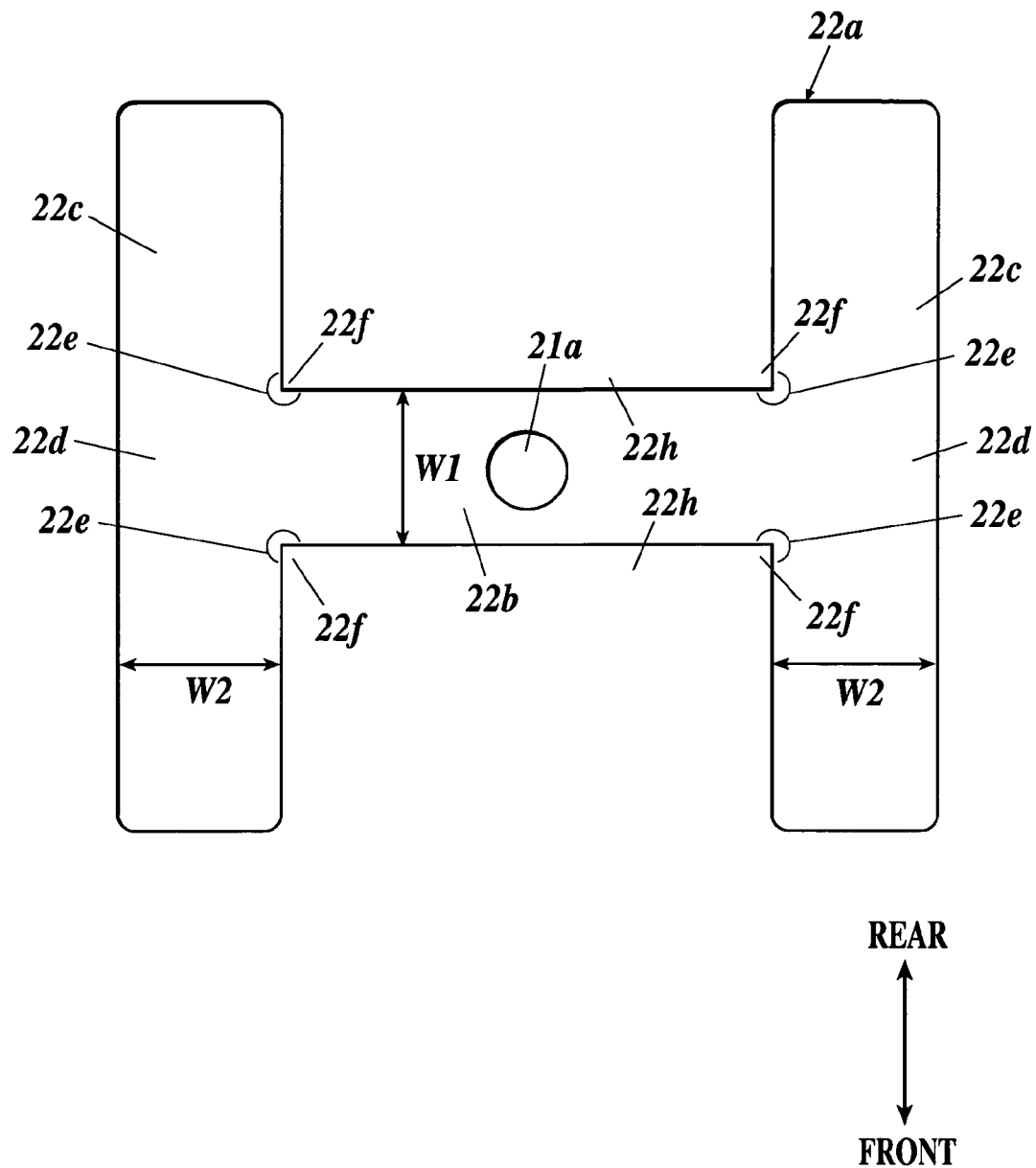
FIG. 3 is a plan view illustrating an air guide hole formed in a pad of the seat cushion.

FIG. 3 is a plan view illustrating the air guide hole 22a in the upper surface of the pad 22 as viewed in a penetrating direction of the air guide hole 22a. This air guide hole 22a includes a lateral belt portion 22b extending in a left-and-right direction, and a pair of longitudinal belt portions 22c and 22c extending in the front-and-rear direction at both ends of the lateral belt portion 22b. A width W1 of the lateral belt portion 22b is preferably set to 10 to 30 mm, more preferably 20 mm. A width W2 of the longitudinal belt portion 22c is preferably set to 10 to 30 mm, more preferably 20 mm.

The lateral belt portion 22b intersects the longitudinal belt portions 22c and 22c at the both ends thereof. Thereby, intersections 22d and 22d are formed. Because the air guide hole 22a is formed in the H slit shape, the air guide hole 22a in the upper surface of the pad 22 is formed in a concaved polygonal, and includes reentrant corners 22e, 22e, 22e and 22e. Since the lateral belt portion 22b intersects the longitudinal belt portions 22c and 22c, a wall surface of the air guide hole 22a forms external corners 22f, 22f, 22f, and 22f. Because the air guide hole 22a is formed in the H slit shape, the pad 22 includes a protruded portion 22h protruded from the front side toward the rear side of the air guide hole 22a and a protruded portion 22h protruded from the rear side toward the front side of the air guide hole 22a, respectively. The lateral belt portion 22b extends in a left-and-right direction between the protruded portions 22h and 22h.

The air guide hole 22a is blocked by the lining material 21, because the lining material 21 is disposed in the lower surface of the pad 22. At the center of the lining material 21, an inlet hole 21a penetrates the lining material 21 up and down. Thus, the inlet hole 21a communicates with the lateral belt portion 22b, and a left-and-right position of the inlet hole 21a is in a middle of the lateral belt portion 22b in a left-and-right direction.

A concaved portion 22d is formed in the upper surface of the pad 22. The air guide hole 22a is formed in a bottom of the concaved portion 22d. A cover 23 made of a slab polyurethane foam material is fitted to the concaved portion 22d to block the air guide hole 22a from above by the cover 23. A surface of the cover 23 and the upper surface of the pad 22 form the same surface.

A plurality of outlet holes 23a, 23a, . . . are formed in the cover 23. These outlet holes 23a, 23a, . . . penetrate the cover 23 up and down. The outlet holes 23a, 23a, . . . are arrayed back and forth in two rows. The outlet holes 23a, 23a, . . . of one row are arrayed along one longitudinal belt portion 22c to penetrate the cover 23 at one longitudinal belt portion 22c. The outlet holes 23a, 23a, . . . of the other row are arrayed along the other longitudinal belt portion 22c to penetrate the cover 23 at the other longitudinal belt portion 22c. The outlet holes may be formed in the cover 23 between both rows to communicate with the lateral belt portion 22b.

Figure 4:
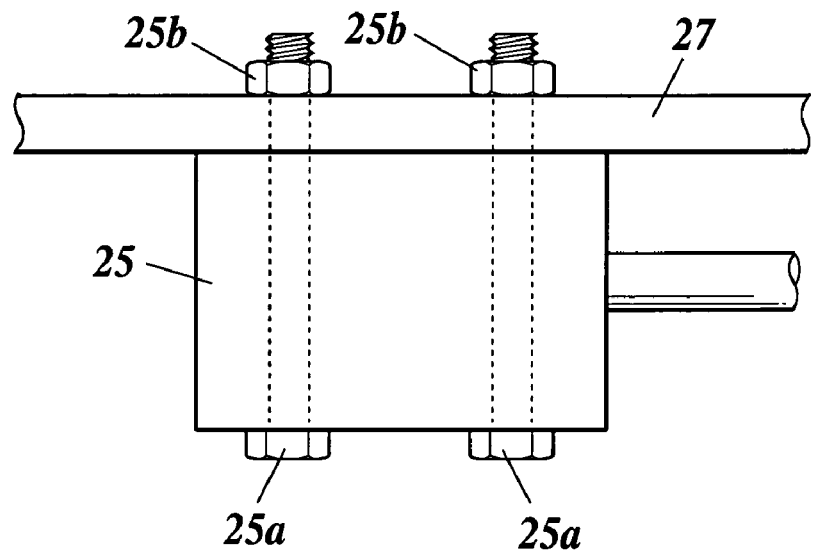
FIG. 4 is a side view illustrating a blower fixing structure of the seat cushion.

FIG. 4 is a side view illustrating a fixing structure of the blower 25. As shown in FIGS. 1, 2 and 4, the blower 25 is fixed to a lower surface of the frame 27 by bolts 25a and nuts 25b. One end of the duct 26 is connected to the blower 25, and the other end of the duct 26 is connected to the inlet hole 21a. A flange 26a is formed at the other end of the duct 26, the other end of the duct 26 is fitted in the inlet hole 21a, and the flange 26a is hooked on an upper surface of the lining material 21 around the inlet hole 21a. A position of disposing the blower 25 is preferably in the front portion or the rear portion of the frame 27. If the blower 25 is disposed in the middle of the frame 27, the middle of the frame 27 is deformed most when an occupant sits on the seat cushion 2.

Figure 5:
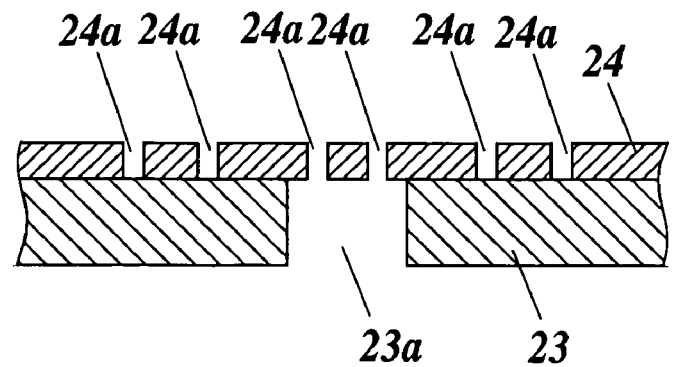
FIG. 5 is a sectional view illustrating a cover and a top cover member of the seat cushion.

As shown in FIGS. 1 and 2, the top cover member 24 covers the cover 23 and the pad 22 from above the cover 23. FIG. 5 is a sectional view illustrating the top cover member 24 and the cover 23. As shown in FIGS. 1 and 5, a plurality of microholes 24a are formed in the top cover member 24. These microholes 24a are formed by punching. Because many microholes 24a are distributed in the top cover member 24, some of them overlap the outlet holes 23a and exhaustion is carried out through the outlet holes 23a and the microholes 24a. When the top cover member 24 is highly permeable, there is no need to form microholes 24a in the top cover member 24.

In the seat cushion 2, when the blower 25 is actuated, air is sent by the blower 25 through the duct 26 to the inlet hole 21a. The air sent to the inlet hole 21a is blown out through the outlet holes 23a, 23a, . . . and the microholes 24a.

As described above, the air guide hole 22a is formed in the pad 22, the inlet hole 21a formed in the lining material 21 communicates with the air guide hole 22a, and the plurality of outlet holes 23a formed in the cover 23 communicate with the air guide hole 22a. Thus, the air guide hole 22a functions as a duct. Because the air guide hole 22a functioning as a duct is formed in the pad 22, it is not required that the duct 26 is branched. As a result, the duct 26 can be miniaturized. One blower 25 can be shared for the plurality of outlet holes 23a.

The air guide hole 22a is disposed in symmetrical fashion. The inlet hole 21 communicates with the center of the air guide hole 22a. A plurality of output holes 23a, 23a, . . . are arrayed in two rows. The outlet holes 23a of one row are symmetrical to the outlet holes 23a of the other row. Thus, air is uniformly blown out from the outlet holes 23a, 23a, . . . .

The air guide hole 22a is formed into the H slit shape by combining a plurality of belt portions. Thus, the buttocks or the thigh of the seated occupant does not sink in the air guide hole 22a. In other words, the buttocks or the thigh of the occupant abuts on the protruded portions 22h or the external corners 22f around the intersections 22d to be supported by the protruded portions 22h or the external corners 22f, and the lateral belt portion 22b and the longitudinal belt portions 22c are elongated. Thus, the buttocks or the thigh of the occupant does not sink in the air guide hole 22a. The air guide hole 22a is formed into not a simple linear slit shape but the H slit shape. Thus, even though an area of the air guide hole 22a itself is small, the air guide hole 22a reaches a wide range of the upper surface of the pad 22. As a result, air is blown out to a wide range of the buttocks or the thigh of the occupant.

Figure 6:
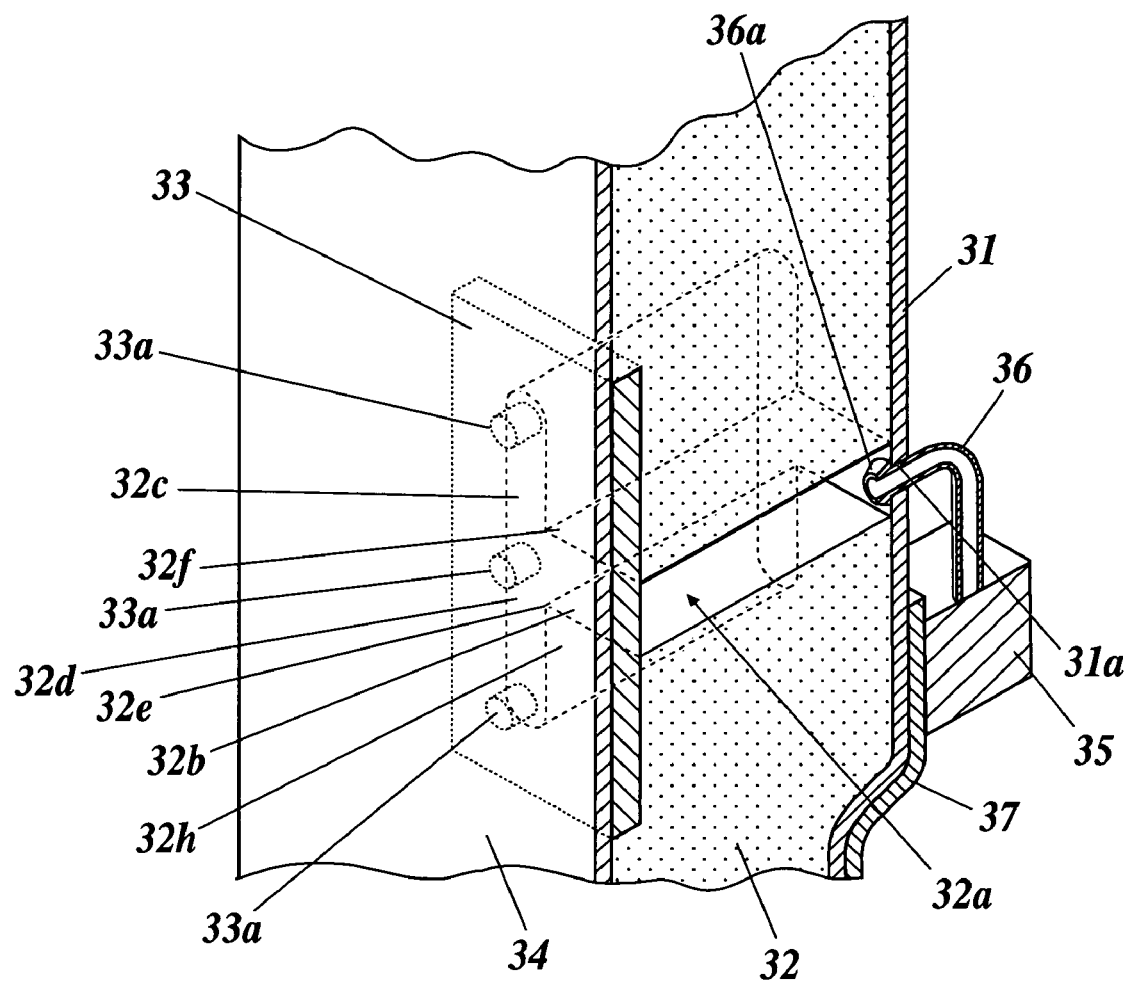
FIG. 6 is a perspective view illustrating a backrest of the vehicle seat in the state of cutting the backrest along the longitudinal section.

The backrest 3 will be explained referring to FIGS. 1 and 6. FIG. 6 is a perspective sectional view illustrating the backrest 3 in the state of cutting the backrest 3.

As shown in FIGS. 1 and 6, a pad 32 is disposed on a frame 37 of the backrest 3. A lining material 31 is stuck to a back of the pad 32, and the pad 32 is formed by foaming. Thus, the lining material 31 and the pad 32 are integrated. An inlet hole 31a is formed in a center of the lining material 31. A concaved portion 32d is formed in a front surface of the pad 32, and an air guide hole 32a is formed in a bottom of the concaved portion 32d. The air guide hole 32a penetrates from the bottom of the concaved portion 32d to a rear surface of the pad 32. The air guide hole 32a is formed into an H slit shape. In other words, the air guide hole 32a includes a lateral belt portion 32b extending in a left-and-right direction, and a pair of longitudinal belt portions 32c and 32c extending up and down in both ends of the lateral belt portion 32b. Because the air guide hole 32a is formed in the H slit shape, as in the case of the air guide hole 22a, intersections 32b are formed between the lateral belt portion 32b and the longitudinal belt portions 32c. Further, external corners 32f are formed by a wall surface of the air guide hole 32a, and the air guide hole 32a in the front surface of the pad 32 has a reentrant corner 32e. The pad 32 includes a protruded portion 32h protruded from the upper portion toward the lower portion of the air guide hole 32a and a protruded portion 32h protruded from lower portion toward the upper portion of the air guide hole 32a.

Regarding to a position of disposing the air guide hole 32a, a middle of the air guide hole 32a in a left-and-right direction is preferably a middle of the pad 32 in a left-and-right direction. A rear opening of the air guide hole 32a is blocked by the lining material 31. The inlet hole 31a formed in the lining material 31 communicates with the air guide hole 32a in a center of the lateral belt portion 32b.

A cover 33 made of a slab polyurethane foam material is fitted to the concaved portion 32d, and a front opening of the air guide hole 32a is blocked by the cover 33. A surface of the cover 33 and the front surface of the pad 32 form the same surface.

A plurality of outlet holes 33a, 33a, . . . are formed in the cover 33. The outlet holes 33a, 33a, . . . are arrayed up and down in two rows. The outlet holes 33a, 33a, . . . of one row are arrayed along one longitudinal belt portion 32c to penetrate the cover 33 at one longitudinal belt portion 32c. The outlet holes 33a, 33a, . . . of the other row are arrayed along the other longitudinal belt portion 32c to penetrate the cover 33 at the other longitudinal belt portion 32c.

A blower 35 is fixed to a back surface of the frame 37. One end of the duct 36 is connected to the blower 35. The other end of the duct 36 is fitted in the inlet hole 31a, and a flange 36a of the other end is hooked in a front surface of the frame 37 around the inlet hole 31a. The blower 35 is preferably disposed on the lower portion of the frame 37. If the blower 35 is disposed in a middle of the frame 37, the middle of the frame 37 is deformed most when the occupant leans on the backrest 3. If the blower 35 is disposed on the upper portion of the frame 37, the blower 35 becomes obtrusive to an occupant behind the seat 1.

The top cover member 34 covers the cover 33 and the pad 32 from above the cover 33. The top cover member 34 includes a plurality of microholes 34a formed by punching. Some of these microholes 34a overlap the outlet holes 33a, and exhaustion is carried out through the outlet holes 33a and the microholes 34a. If the top cover member 34 is highly permeable, there is no need to form microholes 34a in the top cover member 34.

In the backrest 3, when the blower 35 is actuated, air is sent by the blower 35 through the duct 36 to the inlet hole 31a. Then, the air sent to the inlet hole 31a is blown out through the outlet holes 33a, 33a, . . . and the microholes 34a.

The air guide holes 22a and 32a are formed into the H slit shapes. However, other shapes may be employed by combining and communicating a plurality of belt portions with one another. For example, the air guide holes 22a and 32a may be formed into E, F, I, M, N, T, U, V, W, X, Y, Z or horseshoe slit shapes. Even though the air guide holes having any shapes are used, the air guide holes 22a and 32a can reach wide ranges of the pads 22 and 32, and the back or the buttocks of the seated occupant can be prevented from sinking in the air guide holes 22a and 32a. The directions of these character shapes are not limited. However, these shapes are directed so as to be symmetrical. Even though the air guide holes 22a and 32a having any shapes are used, a plurality of outlet holes 23a and 33a are preferably arrayed along the shapes of the air guide holes 22a and 32a, and more preferably the outlet holes 23a and 33a are arrayed so as to be symmetrical. Even though the air guide holes 22a and 32a having any shapes are used, the inlet holes 21a and 31a are more preferably formed in the lining materials 21 and 31 at the middle portions of the air guide holes 22a and 32a in the left-and-right direction.

Figure 7:
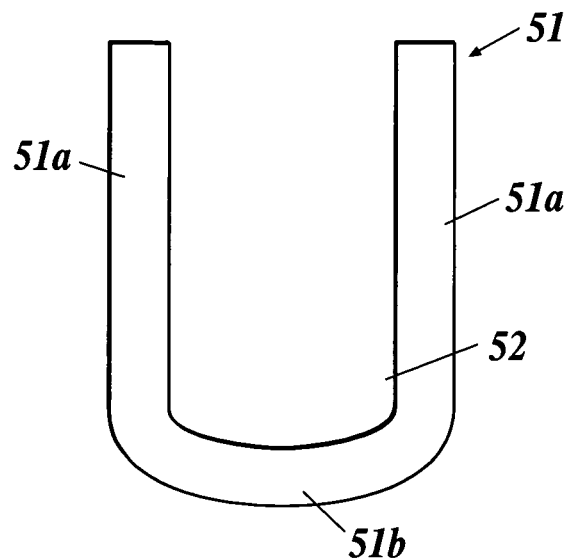
FIG. 7 is a plan view illustrating an air guide hole having another shape.

FIG. 7 is a plan view illustrating an air guide hole 51 having a U slit shape as viewed in a penetrating direction of the air guide hole 51.

As shown in FIG. 7, the air guide hole 51 includes a pair of longitudinal belt portions 51a and 51a, and a bent portion 51b connected with the end of each of the longitudinal belt portions 51a and 51a. When the air guide holes 51 penetrate the pads 22 and 32 respectively in place of the air guide holes 22a and 32a, the pads 22 and 32 includes protruded portions 52 protruded from one side of the air guide hole 51 toward the opposite side.

Figure 8:
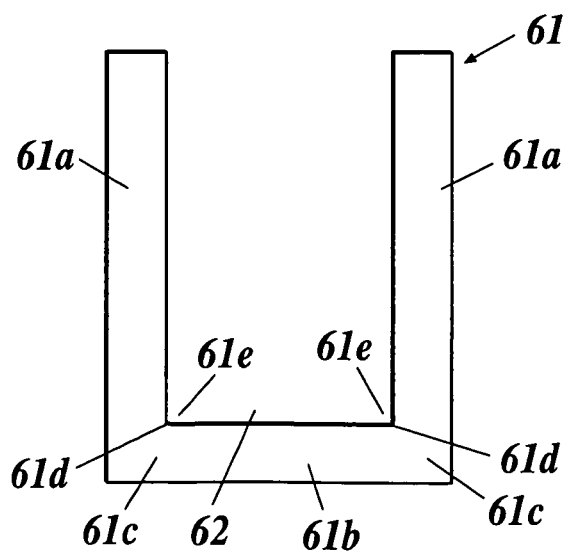
FIG. 8 is a plan view illustrating an air guide hole having another shape.

FIG. 8 is a plan view illustrating an air guide hole 61 having a horseshoe slit shape as viewed in a penetrating direction of the air guide hole 61.

As shown in FIG. 8, the air guide hole 61 includes a pair of longitudinal belt portions 61a and 61a, and a lateral belt portion 62b connected with the end of each of the longitudinal belt portions 61a and 61a. Since the end of each of the longitudinal belt portions 61a are connected with both ends of the lateral belt portion 62b, the connected portions form bent portions 61c. The air guide hole 61 is formed in a horseshoe slit shape, the air guide hole 61 includes reentrant corners 61d and 61d, and external corners 61e and 61e are formed by a wall surface of the air guide hole 61. When the air guide holes 61 penetrate the pads 22 and 32 respectively in place of the air guide holes 22a and 32a, the pads 22 and 32 include protruded portions 62 protruded from one side of the air guide hole 61 toward the opposite side.

Figure 9:
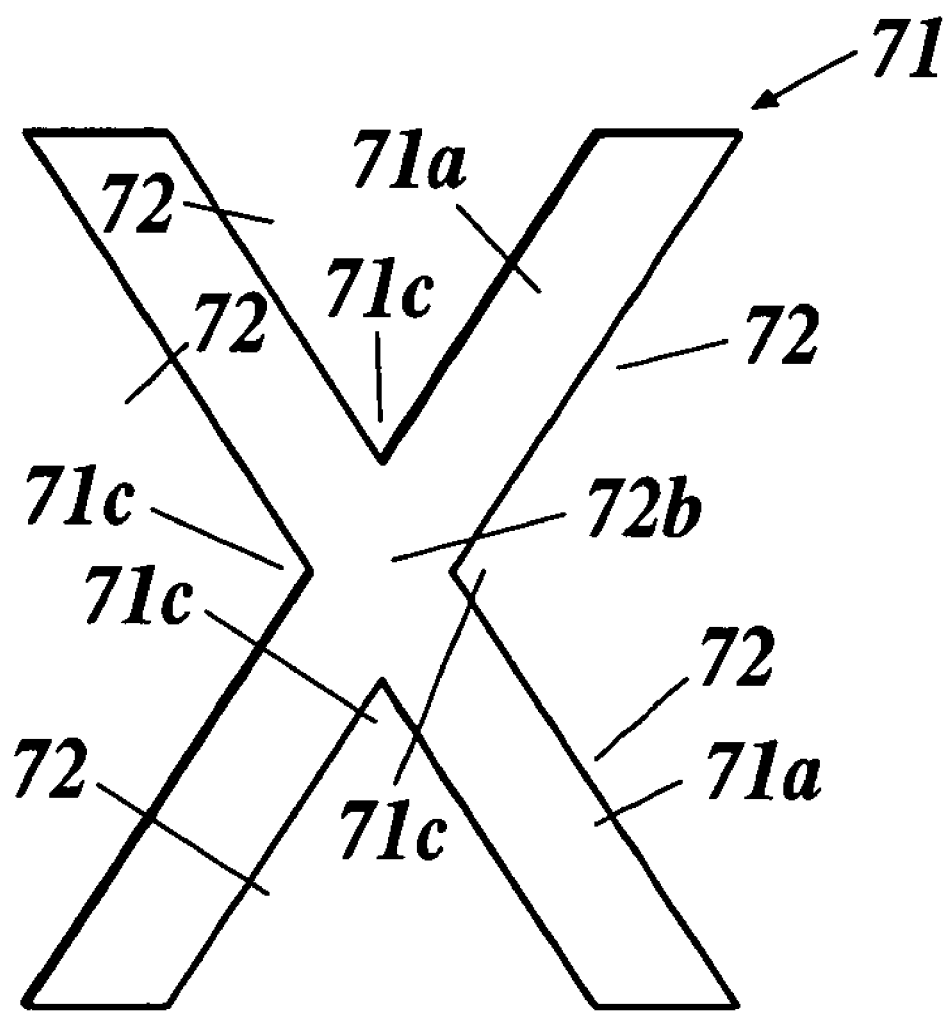
FIG. 9 is a plan view illustrating an air guide hole having another shape.

FIG. 9 is a plan view illustrating an air guide hole 71 having an X slit shape as viewed in a penetrating direction of the air guide hole 71.

As shown in FIG. 9, the air guide hole 71 includes oblique belt portions 71a and 71a intersecting each other. Around an intersection 72b between the belt portions 71a and 71a, external corners 71c, 71c, 71c and 71c are formed by a wall surface of the air guide hole 71. The air guide hole 71 includes reentrant corners at the external corners 71c. When the air guide holes 71 penetrate the pads 22 and 32 respectively in place of the air guide holes 22a and 32a, the pads 22 and 32 include four protruded portions protruded from one side of the air guide hole 71 toward the opposite side respectively.

The present invention is not limited to the above-described embodiment. Various changes and modifications can appropriately be made without departing from the gist of the present invention.

For example, it is not required that the blowers 25 and 35 and the ducts 26 and 36 are disposed. In this case, outlets of an in-room air conditioner of an automobile may be connected with the inlet holes 21a and 31a by a duct to allow air blown from the in-room air conditioner to flow through the duct into the inlet holes 21a and 31a.

Without disposing any ducts 26 or 36, the blowers 25 and 35 may be directly connected to the inlet holes 21a and 31a to directly send air from the blowers 25 and 35 to the inlet holes 21a and 31a.

In the above-described embodiment, the seat according to the present invention is applied to the vehicle seat of the automobile. However, the seat may be applied to seats of other types of vehicles (e.g., airplane and ship). The seat of the invention may be applied to other than vehicles.

According to the above-described embodiment, the air guide holes 22a and 32a are blocked by the lining materials 21 and 31. However, these holes may be blocked by the frames 27 and 37. When the air guide holes 22a and 32a are blocked by the frames 27 and 37, inlet holes are formed in the frames 27 and 37. In this case, the frames 27 and 37 are base members.

In the above-described embodiment, more preferable forming positions of the inlet holes 21a and 31a have been described. However, as long as the inlet hole 21a communicates with the air guide hole 22a and the inlet hole 31a communicates with the air guide hole 32a, forming positions of the inlet holes 21a and 31a are not limited to those of the embodiment. In view of uniform air blowing, forming positions of the inlet holes 21a and 31a, which are described in the embodiment, are preferable.

In accordance with a first aspect of the preferred embodiment of the present invention, a backrest of a seat comprises:
a pad comprising an air guide hole which penetrates the pad from a front surface of the pad to a rear surface of the pad;
a base member for blocking the air guide hole on a rear side of the pad, the base member comprising an inlet hole communicated with the air guide hole; and
a cover for blocking the air guide hole on the front surface of the pad, the cover comprising a plurality of outlet holes communicated with the air guide hole.

Preferably, the air guide hole comprises one of a curved portion, a bent portion and an intersection portion.

Preferably, a profile of the air guide hole on the front surface of the pad comprises a reentrant corner.

Preferably, a wall surface of the air guide hole forms an external corner.

Preferably, the pad comprises a protruded portion protruded from one side of the air guide hole toward an opposite side of the air guide hole as viewed in a penetrating direction of the air guide hole.

Preferably, the air guide hole is symmetrical.

In accordance with a second aspect of the preferred embodiment of the present invention, a seat cushion comprises:
a pad comprising an air guide hole which penetrates the pad from an upper surface of the pad to a lower surface of the pad;
a base member for blocking the air guide hole on a lower side of the pad, the base member comprising an inlet hole communicated with the air guide hole; and
a cover for blocking the air guide hole on the upper surface of the pad, the cover comprising a plurality of outlet holes communicated with the air guide hole.

Preferably, the air guide hole comprises one of a curved portion, a bent portion and an intersection portion.

Preferably, a profile of the air guide hole on the upper surface of the pad comprising a reentrant corner.

Preferably, a wall surface of the air guide hole forms an external corner.

Preferably, the pad comprises a protruded portion protruded from one side of the air guide hole toward an opposite side of the air guide hole as viewed in a penetrating direction of the air guide hole.

Preferably, the air guide hole is symmetrical.

In accordance with a third aspect of the preferred embodiment of the present invention, a seat comprises:
a seat cushion; and
the backrest as defined in the first aspect, the backrest being upright from a rear end of the seat cushion.

In accordance with a fourth aspect of the preferred embodiment of the present invention, a seat comprises:
the seat cushion as defined in the second aspect; and
a backrest which is upright from a rear end of the seat cushion.

According to the first to fourth aspects of the preferred embodiments of the present invention, because the air guide hole is formed in the pad and the plurality of outlet holes are formed in the cover for blocking the air guide hole, the air guide hole functions as a duct. Air blown into the inlet hole is blown out from each of the outlet holes. Thus, there is no need to dispose any large duct in the backrest or the seat cushion, and one blowing source can be shared for the plurality of outlet holes.

By the above preferable shape of the air guide hole, it is possible to prevent buttocks or a back of an occupant from falling into the air guide hole.

The entire disclosure of a Japanese Patent Application No. 2007-265574, filed on Oct. 11, 2007, including specifications, claims, drawings and summaries are incorporated herein by reference in their entirety.

What is claimed is:

1. A backrest of a seat comprising:
a pad comprising an air guide hole which penetrates the pad in a same shape from a front surface of the pad to a rear surface of the pad;
a base member for blocking the air guide hole on a rear side of the pad, the base member comprising only one inlet hole, the only one inlet hole communicating with the air guide hole; and
a cover for blocking the air guide hole on the front surface of the pad, the cover comprising a plurality of outlet holes communicated with the air guide hole,
wherein the pad comprises a protruded portion protruded from one side of the air guide hole toward an opposite side of the air guide hole as viewed in a penetrating direction of the air guide hole.

2. The backrest as claimed in claim 1,
wherein the air guide hole comprises one of a curved portion, a bent portion and an intersection portion.

3. The backrest as claimed in claim 1,
wherein a profile of the air guide hole on the front surface of the pad comprises a reentrant corner.

4. The backrest as claimed in claim 1,
wherein a wall surface of the air guide hole forms an external corner.

5. The backrest as claimed in claim 1, wherein an upper surface of the cover is flush with an upper surface of the pad.

6. The backrest of the seat as claimed in claim 1, wherein the air guide hole is symmetrical.

7. A seat comprising:
a seat cushion; and
the backrest as claimed in claim 1, the backrest being upright from a rear end of the seat cushion.

8. The backrest as claimed in claim 1, further comprising:
a top cover for covering the pad and the cover.

9. A seat cushion comprising:
a pad comprising an air guide hole which penetrates the pad in a same shape from an upper surface of the pad to a lower surface of the pad;

a base member for blocking the air guide hole on a lower side of the pad, the base member comprising only one inlet hole, the only one inlet hole communicating with the air guide hole; and a cover for blocking the air guide hole on the upper surface of the pad, the cover comprising a plurality of outlet holes communicated with the air guide hole, wherein the pad comprises a protruded portion protruded from one side of the air guide hole toward an opposite side of the air guide hole as viewed in a penetrating direction of the air guide hole.

10. The seat cushion as claimed in claim 9, wherein a wall surface of the air guide hole forms an external corner.

11. The seat cushion as claimed in claim 9, wherein the air guide hole comprises one of a curved portion, a bent portion and an intersection portion.

12. The seat cushion as claimed in claim 9, wherein the air guide hole is symmetrical.

13. The seat cushion as claimed in claim 9, wherein a profile of the air guide hole on the upper surface of the pad comprising a reentrant corner.

14. A seat comprising:
the seat cushion as claimed in claim 9; and
a backrest which is upright from a rear end of the seat cushion.

15. The seat cushion as claimed in claim 9, further comprising:
a top cover for covering the pad and the cover.

16. The seat cushion as claimed in claim 9, wherein an upper surface of the cover is flush with an upper surface of the pad.

* * * * *